Dec. 4, 1956 H. L. SHAW ET AL 2,772,897
SIDE DELIVERY ROTARY FITTING
Filed July 27, 1953
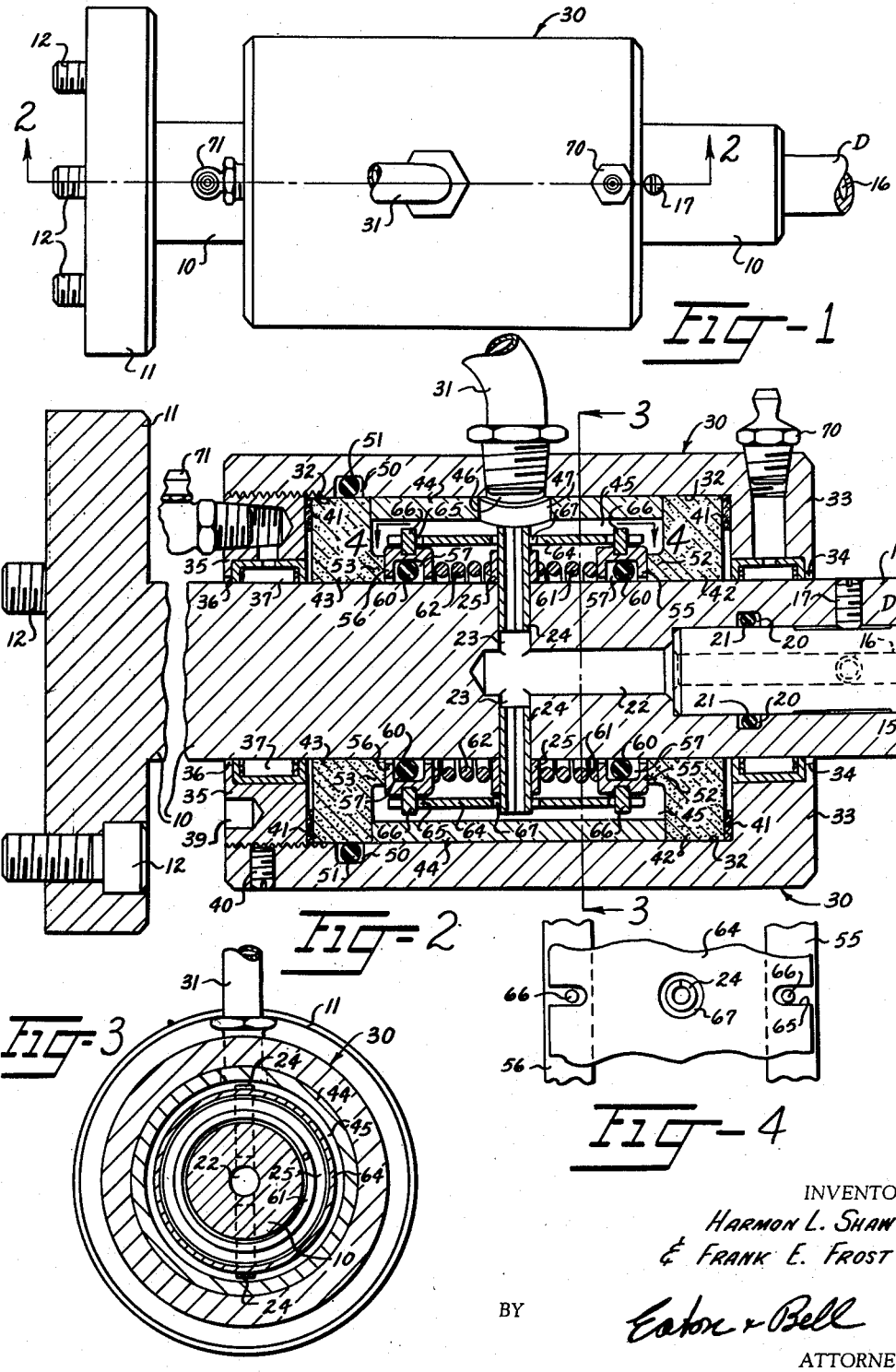
INVENTORS:
HARMON L. SHAW
& FRANK E. FROST
BY
Eaton & Bell
ATTORNEYS.

United States Patent Office 2,772,897
Patented Dec. 4, 1956

2,772,897
SIDE DELIVERY ROTARY FITTING

Harmon L. Shaw and Frank E. Frost, Charlotte, N. C., assignors to Perfecting Service Co., Charlotte, N. C., a corporation of North Carolina Application July 27, 1953, Serial No. 370,590

6 Claims. (Cl. 285—190)

This invention relates to rotary fittings and more especially to a side or radial delivery rotary fitting or connection wherein means are provided for introducing fluid or the like into the side of a rotary member.

Heretofore various types of rotary joints have been utilized for introducing or withdrawing fluid from the end of a rotary member, that is axially, and in many instances this is not practical or possible due to space limitations. It is therefore the primary object of this invention to provide a rotary fitting which may be positioned intermediate the ends of a rotating member and being provided with means for introducing or withdrawing fluid intermediate the ends of the rotary member and which joint also includes sealing and bearing means so arranged as to give a positive seal under high speed operation.

This invention may be used with various types of shafts or rotary members and is illustrated in association with a chuck adaptor for a machine tool utilizing a relatively long boring tool or drill having bores therein for feeding a liquid coolant or lubricant to the cutting end of the boring tool. This type of machine tool is usually known as a gun drill since it is used extensively in drilling gun barrels. The present invention is particularly adapted to be used with a chuck or drill of this type.

Heretofore, in attempting to provide satisfactory cooling means for high speed gun drills and the like, attempts have been made to introduce coolant axially through the end of the chuck, but such attempts have not proven satisfactory in view of space limitations and sealing and pressure requirements for high speed work. It is therefore a primary object of this invention to provide means for introducing fluid radially of a rotary member such as a drilling tool and which means provides an effective seal under high pressure and high speed operating conditions and which means is compact and does not interfere with the other parts of the machine.

The improved rotary fitting is provided with a housing which may be stationary and in which a rotary member such as a chuck adaptor shaft is rotatably mounted. One end of the adaptor shaft is adapted to be connected to the spindle or chuck of a lathe or other boring machine and the other end has a bore therein for the reception of a tubular drill. The rotary fitting is provided with means for directing a liquid coolant or lubricant through the housing and into the adaptor shaft and thence into the tubular drill and, also, novel means is provided to prevent the lubricant or coolant from leaking between the housing and the adaptor shaft.

More specifically, it is an object of this invention to provide a rotary fitting of the type described wherein the housing has a pair of spaced non-resilient sealing and bearing rings fixed therein, the sealing and bearing rings preferably being made from graphite with their outer peripheral surfaces slidably engaging the wall of the housing and their inner peripheral surfaces slidably engaging the periphery of the rotary member. The spaced sealing and bearing rings define a coolant reservoir, cavity or chamber therebetween and means are provided for admitting fluid such as liquid coolant or lubricant into the reservoir or chamber. The rotary member has an axially extending passageway therein which communicates with radially extending passageways through which the fluid passes from the chamber and into the axially extending passageway.

A novel sealing means is provided in the chamber to prevent fluid from escaping therefrom which comprises a pair of annular face rings whose distal surfaces are adapted to move in sliding engagement with the proximal surfaces of said sealing and bearing rings and each of which has a peripheral groove in the inner face thereof in which a resilient O-ring is positioned, which O-ring snugly engages the rotary member and also snugly engages the bottom of the groove in the corresponding face ring. Means are provided to cause the face rings to rotate with the rotary member and resilient means are provided for resiliently pressing the distal surfaces of the face rings against the proximal surfaces of the sealing and bearing rings to thereby permit relative rotational movement between the sealing and bearing rings and the face rings and to prevent lubricant or liquid coolant from escaping between the face rings and the sealing and bearing rings.

Some of the objects of the invention have been stated, other objects will appear as the description proceeds, when taken in connection with the accompanying drawings, in which—

Figure 1 is an elevation or plan view of the improved rotary fitting showing the same in association with a chuck adaptor and showing a portion of a drill extending therefrom;

Figure 2 is an enlarged longitudinal sectional view taken along line 2—2 in Figure 1;

Figure 3 is a transverse sectional view taken substantially along line 3—3 in Figure 2;

Figure 4 is a fragmentary plan view looking along the line 4—4 in Figure 2.

Referring more specifically to the drawings, the numeral 10 generally designates a rotary member which is shown as an adaptor adapted to be connected to a spindle or chuck of a boring machine, such as a lathe. The shaft 10 in the present instance is provided with a flange 11 adapted to be connected to a driving member such as a spindle by any suitable means such as screws 12. It is to be understood that the flange 11 may be omitted and the shaft 10 may be supported in the usual type of adjustable jaw chuck or it may be provided with a tapered end which fits in a correspondingly internally tapered chuck, the flange 11 being shown by way of illustration only. The shaft 10 has an axial bore 15 in its outer or free end, that is, the end thereof opposite from the flange 11 and in which one end of a hollow or tubular drill D fits, only a portion of the drill being shown.

The drill D is of a type which is relatively long, such as a gun drill, and is therefore provided with a longitudinally extending or axial passageway 16 therein for directing a liquid coolant or lubricant to the free cutting end thereof, not shown. The drill D is secured in the bore 15 by any suitable means such as one or more set screws 17 and, in order to prevent the liquid coolant or lubricant from escaping or leaking around the drill D, the wall of the bore 15 is provided with an annular groove 20 in which a suitable sealing ring or O-ring 21 is positioned.

The rotary member 10 may be of any desired construction and when forming a part of a chuck adapter as in the present illustration, may be provided with a tapered bore for reception of a tapered tool or drill or with any other suitable means for connecting the same to the tool or drill in lieu of the bore 15. The shaft 10 has an axial bore or passageway 22 therein which communicates with, and is of lesser diameter than, the bore 15. The shaft 10 also has a plurality of circularly spaced radially extending passageways 23 therein whose proximal ends communicate with the passageway 22. There are only two of the passageways 23 shown in the drawings, although it is to be understood that any desired number of such passageways may be provided.

Each of the bores or passageways 23 has a tubular roll pin 24 fixed therein, as by a press fit which extends outwardly substantially beyond the periphery of the shaft 10 and slidably penetrates a drive ring or pressure ring 25. The drive ring or pressure ring 25 snugly encircles the shaft 10 and is held in fixed relation to the shaft 10 by the tubes 24.

The medial portion of the shaft 10 is surrounded by a stationary housing 30 which is preferably circular, but may be of any desired construction and which may be restrained from rotation by any desired means, such as a fixed lubricant feeding or liquid coolant feeding pipe or conduit 31, which may be flexible if desired.

The housing 30 has a relatively large bore 32 therein which is substantially closed at one end thereof by an inwardly projecting annular portion 33 having a bore 34 therethrough through which the shaft 10 loosely extends. The other end of the bore 32 is closed by an externally threaded lock ring 35 which is threadably mounted in the corresponding threaded end of the bore 32, and suitably secured therein as by a set screw 40 and provided with openings 39 for reception of a spanner wrench, if desired. The lock ring 35 also has an axial bore 36 therethrough through which the corresponding portion of the shaft 10 loosely extends. The annular portion 33 of the housing 30 and the lock ring 35 preferably are each provided with a suitable anti-friction bearing 37 mounted therein, which are shown in the form of needle bearings or roller bearings.

Each of the proximal surfaces of the annular portion 33 of housing 30 and the lock ring 35 has a resilient or cork gasket 41 disposed thereagainst whose proximal surfaces bear against the distal surfaces of friction type sealing and bearing rings 42 and 43 whose outer peripheries snugly fit in the bore 32 and whose inner peripheries snugly fit around the shaft 10 and act as bearings therefor. These sealing and bearing rings 42 and 43 which may also be termed as rigid or stationary sealing rings may be made from a lubricant impregnated non-ferrous metal, but are preferably made from compressed graphite.

The sealing and bearing rings 42 and 43 are held in spaced relationship by means of a spacing sleeve or spacer 44 which slidably fits in the bore 32 and whose distal ends engage the proximal surfaces of the sealing and bearing rings 42 and 43. Thus, the lock ring 35 securely locks the sealing and bearing rings 42 and 43 and the spacing sleeve or spacer 44 in the bore 32 and the sealing and bearing rings 42 and 43 define a reservoir or chamber 45 for liquid coolant or lubricant therebetween to which fluid such as lubricant or liquid coolant is directed from a suitable source, not shown, through the pipe 31.

It will be noted that the housing 30 has an internally threaded radially extending bore 46 therein in which the corresponding end of the pipe 31 is threadably secured and the spacer 44 also has a passageway or aperture 47 which coincides or communicates with the bore 46 to permit fluid to flow from the pipe 31 into the chamber 45. In order to insure that the fluid such as lubricant or liquid coolant does not leak from the chamber 45 past the periphery of the sealing and bearing ring 43 adjacent the locking ring 35, the surface of the bore 32 has an annular groove 50 therein in which a relatively large resilient O-ring 51 is positioned which O-ring is, of course, compressed slightly by the periphery of the sealing and bearing ring 43 when it is slid into position as shown in Figure 2.

The proximal surfaces of the sealing and bearing rings 42 and 43 have respective annular shoulder portions 52 and 53 formed thereon which are of substantially the same internal diameter as the internal diameter of the rings 42 and 43, but whose external diameters are substantially less than the external diameters of the rings 42 and 43. The proximal surfaces of the shoulders 52 and 53 engage the distal surfaces of respective face rings or O-ring carrier rings 55 and 56, respectively, which loosely encircle the shaft 10 and each of which has an annular groove 57 in the inner periphery thereof in which a corresponding resilient O-ring 60 is positioned, each of the O-rings 60 being compressed slightly by the shaft 10 extending therethrough. The grooves 57 are of greater width than the thickness of the respective resilient O-rings 60 to permit each O-ring to float with its groove 57 upon movement of the respective face rings thus providing a constant seal between the face rings 55 and 56 and the shaft 10. The distal surfaces of the face rings 55 and 56 are resiliently urged into sliding contact with the proximal surfaces of the shoulder portions 52 and 53 on the respective rings 42 and 43 by respective compression springs 61 and 62 whose proximal ends bear against opposite surfaces of the pressure ring or drive ring 25.

The O-ring carrier rings or face rings 55 and 56 are caused to rotate with the shaft 10 by means of a drive drum or sleeve 64 which is provided with relatively small longitudinally extending slots 65 formed in opposite ends thereof in which suitable pins or abutments 66, projecting radially from each of the face rings 55 and 56 are loosely fitted. These pins 66 may be pushed into the face rings 55 and 56, as shown in Figure 2. The central portion of the drive drum or sleeve 64 has a pair of diametrically opposed apertures or bores 67 therein and it will be noted that the outer ends of the tubes or roll pins 24 extend outwardly beyond the pressure ring or drive ring 25 and loosely extend through the apertures or bores 67 in the drive drum or sleeve 64. The drive drum or sleeve 64 may slidably or loosely engage the peripheries of the face rings 55 and 56 as desired.

It is thus seen that, upon fluid such as liquid coolant or lubricant being fed through the pipe 31 into the chamber 45, the fluid flows from the chamber 45 through the tubes 24, passageway 23 and passageway 22 into the passageway 16 in the drill D to thereby lubricate the cutting end of the drill D. During the drilling operation, the housing 30 preferably remains stationary and the shaft 10 rotates in the bearings 37 and in the sealing and bearing rings 42 and 43. The O-rings 60, the face rings 55 and 56, the drive drum or sleeve 64, springs 61 and 62, the pressure ring or drive ring 25 and the tubes 24 also rotate with the shaft 10 and relative to the housing 30.

At all times, the compression springs 61 and 62 cause the distal surfaces of the face rings 55 and 56 to seat tightly against the proximal surfaces of the shoulder portions 52 and 53 of the graphite rings 42 and 43 thereby insuring that fluid introduced into the chamber 45 cannot escape or leak between the adjacent surfaces of the face rings 55 and 56 and the shoulders 52 and 53 of the graphite rings 42 and 43. Also, the O-rings 60 prevent the fluid from escaping between the shaft 10 and the face rings 55 and 56. Fluid is permitted to fill the cavity 45 around the springs 61 and 62 and the proximal surfaces of the face rings 55 and 56 so that fluid pressure will also act against the proximal surfaces of the face rings 55 and 56 to urge the same apart for further maintaining a constant seal between the face rings 55 and 56 and the bearing and sealing rings 42 and 43.

The anti-friction bearings 37 are desirable when the shaft 10 is driven at a relatively high rate of speed and suitable lubricant fittings 70 and 71 are provided in the housing at the annular portion 33 thereof and in the locking ring 35, respectively, for introducing lubricant to the antifriction bearings 37. However, when the shaft 10 is to be driven at a relatively slow rate of speed, the antifriction bearing 37 and the corresponding lubricant fittings 70 and 71 may be omitted if so desired, since the graphite sealing and bearing rings 42 and 43 will serve amply as friction bearings to permit relative rotational movement between the housing 30 and the shaft 10.

While the shaft 10 is shown as a part of the composite rotary joint, it is to be understood that in operation it is actually a part of the rotary member or members to which it is connected. For example when connected at one end to a spindle or chuck of a drilling machine or the like and connected to the drill at its other end it becomes an intermediate part of the composite rotary member comprising the spindle or chuck, the shaft 10 and the drill. In some instances it may be desirable to extend the axial bore within the shaft 10 through the entire length of the shaft 10 so that fluid may flow out of each end of the shaft 10 into suitable rotating members connected to the shaft 10. The structure of the shaft 10 may vary in different installations and the primary object of this invention is to provide means for introducing fluid intermediate the ends of the shaft 10 leaving the ends free to be connected to suitable driving or driven rotating members.

In the drawings and specifications, there has been set forth a preferred embodiment of the invention and, although specific terms are employed, they are used in a generic and descriptive sense only, and not for purposes of limitation, the scope of the invention being defined in the claims.

We claim:

1. A side delivery rotary fitting comprising a housing, a rotary member mounted in and extending through said housing and having a fluid passageway therein communicating with the interior of said housing, a pair of spaced combination sealing and bearing rings fixed in said housing and frictionally engaging said rotary member, said sealing and bearing rings defining a fluid chamber within said housing, a pair of face rings positioned in said chamber and about said rotary member and each having an annular groove in its inner periphery, a resilient O-ring positioned in the annular groove of each of said face rings and frictionally engaging said face ring and said rotary member, resilient means contacting the proximate surfaces of the face rings and urging the opposed surfaces of the face rings into engagement with the sealing and bearing rings, a drive drum positioned around said rotary member, means connecting the rotary member and the drive drum, the drive drum being keyed to the external surfaces of the face rings to cause the same to rotate with the rotary member while permitting axial movement relative thereto, and means for introducing fluid through said housing and into said fluid chamber.

2. A rotary fitting comprising a shaft adapted to be connected at at least one of its ends to a rotary member, a stationary housing surrounding the shaft intermediate its ends, a pair of spaced combination friction sealing and bearing rings, means securing said sealing and bearing rings in said housing with the outer peripheries thereof in sealing engagement with said housing, the inner peripheries of said sealing and bearing rings frictionally and rotatably engaging the periphery of said shaft, a spacer sleeve extending around the shaft in spaced relation thereto and between the sealing and bearing rings, said spacer sleeve and said sealing and bearing rings defining a fluid chamber extending around an intermediate portion of said shaft, a pair of spaced face rings disposed within said fluid chamber between the sealing and bearing rings and loosely encircling said shaft, each face ring having a groove in its inner periphery, a resilient O-ring snugly encircling said shaft and disposed in the groove in each of said face rings, a drive ring fixed about said shaft intermediate the face rings, a coiled spring positioned between the drive ring and each face ring and urging the face rings apart from each other against the proximal surfaces of the sealing and bearing rings, a drive drum in said fluid chamber and extending around said face rings and keyed thereto, means connecting the drive drum to said shaft to cause the face rings to rotate with said shaft, means for introducing a lubricant into said fluid chamber through said housing and said spacer sleeve, and said shaft having at least one passageway therein communicating with the fluid chamber and also communicating with at least one end of the shaft to thereby permit fluid to flow through said shaft and into the rotary member connected thereto.

3. A side delivery rotary fitting comprising a housing, a rotary member extending through said housing and having its ends disposed exteriorly of the ends of said housing, a pair of spaced sealing and bearing rings fixedly sealed in said housing and rotatably and frictionally engaging the periphery of said rotary member, said sealing and bearing rings defining an annular fluid chamber within said housing around an intermediate portion of said rotary member, means for introducing fluid through said housing and into said chamber, said rotary member having passageways therein for reception of fluid from said chamber and spring pressed sealing means within said chamber and rotatable with said rotary member for frictionally engaging the proximal surfaces of said sealing and bearing rings to further seal said fluid chamber, said spring pressed sealing means comprising a pair of face rings positioned around said rotary member and in engagement with said sealing and bearing rings, resilient seal means between each of said face rings and said rotary member, a drive ring fixed on said shaft approximately midway between the face rings, a pair of springs disposed one on each side of the drive ring and engaging the proximal surfaces of the face rings for exerting equal pressure on the face rings, and a drive drum extending around said face rings and keyed thereto and also connected to said rotary member to cause said face rings to rotate with said rotary member and to permit said face rings to move longitudinally on said rotary member.

4. A side delivery rotary fitting comprising a housing, a rotary member extending through said housing and having its ends disposed exteriorly of the ends of said housing, a pair of spaced sealing and bearing rings fixedly sealed in said housing and frictionally engaging the periphery of said rotary member, said sealing and bearing rings defining an annular fluid chamber within said housing around an intermediate portion of said rotary member, means for introducing fluid through said housing and into said chamber, said rotary member having at least one radial passageway therein communicating with said chamber for reception of fluid from said chamber and at least one axial passageway communicating with said radial passageway and spring pressed sealing means within said chamber and rotatable with said rotary member for frictionally engaging the proximal surfaces of said sealing and bearing rings to further seal said fluid chamber, said sealing means comprising a pair of face rings positioned around said rotary member and in engagement with said sealing and bearing rings, resilient means between each of said face rings and said rotary member, a drive ring around said rotary member spaced between said face rings, at least one hollow roll pin extending through said drive ring and into the radial passageway in said rotary member, a coiled spring positioned around said rotary member between said drive ring and each of said face rings, a drive drum extending around said face rings and keyed thereto, said roll pin extending through said drive drum to cause said drive drum and said face rings to rotate with said rotary member and to permit said face rings to move longitudinally on said rotary member.

5. A rotary fitting comprising a shaft adapted to be connected at at least one of its ends to a rotary member, a stationary housing surrounding the shaft intermediate its ends, a pair of spaced friction sealing and bearing rings, means securing said sealing and bearing rings in said housing with the outer peripheries thereof in sealing engagement with said housing, the inner peripheries of said sealing and bearing rings frictionally engaging the periphery of said shaft, a spacer sleeve extending around the shaft in spaced relation thereto and between the sealing and bearing rings, said spacer sleeve and said sealing and bearing rings defining a fluid chamber extending around an intermediate portion of said shaft, a pair of spaced face rings disposed within said fluid chamber between the sealing and bearing rings and loosely encircling said shaft, each face ring having a groove in its inner periphery, a resilient O-ring snugly encircling said shaft and disposed in the groove in each of said face rings, a drive ring fixed about said shaft intermediate the face rings, a coiled spring positioned between the drive ring and each face ring and urging the face rings apart from each other against the proximal surfaces of the sealing and bearing rings, a drive drum in said fluid chamber and extending around said face rings and keyed thereto, means connecting the drive drum to said shaft to cause the face rings to rotate with said shaft, means for introducing a lubricant into said fluid chamber through said housing and said spacer sleeve, said shaft having at least one radial passageway therein communicating with the fluid chamber and at least one axial passageway therein communicating with the radial passageway and with at least one end of the shaft to thereby permit fluid to flow through said shaft and into the rotary member connected thereto, and the means connecting the drive drum to the shaft comprising at least one hollow roll pin extending through the drive drum and the drive ring and into the radial passageway in said shaft.

6. A side delivery rotary fitting comprising a housing, a rotary member extending through said housing and having at least one of its ends disposed exteriorly of the ends of said housing, a pair of spaced sealing and bearing rings fixedly sealed in said housing and supporting said rotary member, said sealing and bearing rings defining an annular fluid chamber within said housing around an intermediate portion of said rotary member, means for introducing fluid through said housing and into said chamber, said rotary member having at least one radial passageway therein communicating with said chamber for reception of fluid from said chamber and at least one axial passageway communicating with said radial passageway, and spring pressed sealing means within said chamber and rotatable with said rotary member for frictionally engaging the proximal surfaces of said sealing and bearing rings to further seal said fluid chamber, said sealing means comprising a pair of face rings positioned around said rotary member and in engagement with said sealing and bearing rings, means sealing between each of said face rings and said rotary member, at least one fluid conduit pin extending into the radial passageway in said rotary member, a drive drum extending around said face rings and keyed thereto, said pin extending through said drive drum to cause said drive drum and said face rings to rotate with said rotary member and to permit said face rings to move longitudinally on said rotary member.

References Cited in the file of this patent

UNITED STATES PATENTS

| | | |
|---|---|---|
| 1,859,436 | Durdin | May 24, 1932 |
| 2,210,088 | Longfield | Aug. 6, 1940 |
| 2,384,281 | Carter | Sept. 4, 1945 |
| 2,459,643 | Hartley | Jan. 18, 1949 |
| 2,496,471 | Hornbostel | Feb. 7, 1950 |